US011918835B2

(12) United States Patent
Jancarik et al.

(10) Patent No.: US 11,918,835 B2
(45) Date of Patent: Mar. 5, 2024

(54) POWERED AIR-PURIFYING RESPIRATOR (PAPR) WITH ECCENTRIC VENTURI AIR FLOW RATE DETERMINATION

(71) Applicant: Honeywell International Inc., Charlotte, NC (US)

(72) Inventors: Julius Jancarik, Brno (CZ); Garaga Phani Kumar, Hyderabad (IN); Anjaiah Tumu, Hyderabad (IN); Jonathan Sugerman, Cranston, RI (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 205 days.

(21) Appl. No.: 17/136,331

(22) Filed: Dec. 29, 2020

(65) Prior Publication Data

US 2021/0113861 A1 Apr. 22, 2021

Related U.S. Application Data

(63) Continuation of application No. 15/654,371, filed on Jul. 19, 2017, now Pat. No. 10,960,237.

(51) Int. Cl.
*A62B 18/00* (2006.01)
*F04D 27/00* (2006.01)

(52) U.S. Cl.
CPC .......... *A62B 18/006* (2013.01); *F04D 27/001* (2013.01)

(58) Field of Classification Search
CPC ....... G01F 1/44; F04D 27/001; A62B 18/006; A61M 16/0012; A61M 1/804; A61M 60/211; F01N 2470/30
See application file for complete search history.

(56) References Cited

U.S. PATENT DOCUMENTS 3,835,831 A * 9/1974 Ross ........................ F02M 1/04 123/179.15
4,509,371 A 4/1985 Wellman
(Continued)

FOREIGN PATENT DOCUMENTS

CN 1950151 A 4/2007
CN 101642728 A 2/2010
(Continued)

OTHER PUBLICATIONS

CN Office Action dated Nov. 9, 2021 for CN Application No. 201810795593, 3 pages.
(Continued)

*Primary Examiner* — Samchuan C Yao
*Assistant Examiner* — Nathan M Le
(74) *Attorney, Agent, or Firm* — Alston & Bird LLP

(57) ABSTRACT

A powered air-purifying respirator (PAPR). The PAPR comprises an air pump comprising an electric motor, an eccentric venturi communicatively coupled to an air channel of the air pump, wherein the eccentric venturi comprises a first sensor port and a second sensor port, a differential air pressure sensor mechanically coupled to the first sensor port and the second sensor port, and a controller that is communicatively coupled to an electrical output of the differential air pressure sensor and to the electric motor, wherein the controller is configured to control the speed of the electric motor to maintain a predefined rate of flow of purified air based on the electrical output of the differential air pressure sensor.

14 Claims, 4 Drawing Sheets

(Section C-C')

(56) References Cited

U.S. PATENT DOCUMENTS

| | | | | |
|---|---|---|---|---|
| 5,586,861 | A | 12/1996 | Berger | |
| 5,641,915 | A | 6/1997 | Ortiz et al. | |
| 5,918,637 | A | 7/1999 | Fleischman | |
| 6,241,463 | B1 | 6/2001 | Bahner et al. | |
| 6,339,963 | B1 | 1/2002 | Torkildsen | |
| 6,435,183 | B1 | 8/2002 | Farman | |
| 7,044,434 | B2 | 5/2006 | Brinks et al. | |
| 7,299,707 | B1 | 11/2007 | Evans | |
| 9,267,700 | B2 | 2/2016 | Bach et al. | |
| 9,387,299 | B2 | 7/2016 | Zwolinsky et al. | |
| 9,599,075 | B2 * | 3/2017 | Luehrsen | F02M 25/0872 |
| 9,631,959 | B1 | 4/2017 | Wang | |
| 2001/0035054 | A1 | 11/2001 | Maeda et al. | |
| 2002/0178837 | A1 * | 12/2002 | Brandt, Jr. | G01F 1/46 73/861.63 |
| 2002/0189369 | A1 * | 12/2002 | Lewis | G01N 1/2252 73/861.63 |
| 2003/0180149 | A1 | 9/2003 | Krugerke | |
| 2008/0264182 | A1 * | 10/2008 | Jones | G01F 1/363 73/861.63 |
| 2009/0064795 | A1 | 3/2009 | Harper | |
| 2013/0092164 | A1 | 4/2013 | Curran et al. | |
| 2013/0319408 | A1 | 12/2013 | Zwolinsky et al. | |
| 2015/0007815 | A1 | 1/2015 | Duquette et al. | |
| 2015/0083134 | A1 | 3/2015 | Walker et al. | |
| 2016/0121345 | A1 | 5/2016 | Walsh et al. | |
| 2019/0022433 | A1 | 1/2019 | Jancarik et al. | |

FOREIGN PATENT DOCUMENTS

| | | | |
|---|---|---|---|
| CN | 102740931 | A | 10/2012 |
| CN | 102990265 | A | 3/2013 |
| CN | 203763701 | U | 8/2014 |
| CN | 204241043 | U | 4/2015 |
| CN | 104634396 | A | 5/2015 |
| CN | 105466502 | A | 4/2016 |
| EP | 0352938 | A2 | 1/1990 |
| EP | 0552916 | A1 | 7/1993 |
| EP | 3111997 | A1 | 1/2017 |
| WO | 2005/089947 | A2 | 9/2005 |
| WO | 2009/034532 | A2 | 3/2009 |

OTHER PUBLICATIONS

English Translation of CN Office Action dated Nov. 9, 2021 for CN Application No. 201810795593, 4 pages.

CN Office Action, including Search Report, dated Sep. 29, 2022 for CN Application No. 202210445622, 10 pages. (English Summary of Office Action only).

Communication about intention to grant a European patent dated Jan. 13, 2022 for EP Application No. 18184236, 7 pages.

Decision to grant a European patent dated Aug. 19, 2022 for EP Application No. 18184236, 2 pages.

U.S. Appl. No. 15/654,371, filed Jul. 19, 2017, US 2019-0022433 A1, To Issue on Feb. 16, 2021.

CN Office Action dated Jul. 2, 2021 for CN Application No. 201810795593.

English Translation of CN Office Action dated Jul. 2, 2021 for CN Application No. 201810795593.

CN Office Action, including Search Report, dated Dec. 21, 2020 for CN Application No. 201810795593.

Communication from the Examining Division dated Jan. 28, 2019 for EP Application No. 18184236.

English Translation of CN Office Action, including Search Report, dated Dec. 21, 2020 for CN Application No. 201810795593.

Europe Patent Application No. 18184236.0, Extended European Search Report, dated Dec. 5, 2018, 6 pages.

Examiner initiated interview summary (PTOL-413B) dated Oct. 2, 2020 for U.S. Appl. No. 15/654,371.

Final Rejection dated Feb. 6, 2020 for U.S. Appl. No. 15/654,371.

Non-Final Rejection dated Jul. 22, 2019 for U.S. Appl. No. 15/654,371.

Non-Final Rejection dated Jun. 11, 2020 for U.S. Appl. No. 15/654,371.

Notice of Allowance and Fees Due (PTOL-85) dated Oct. 2, 2020 for U.S. Appl. No. 15/654,371.

Notice of Allowance and Fees Due (PTOL-85) dated Oct. 6, 2020 for U.S. Appl. No. 15/654,371.

Communication, second, about intention to grant a European patent dated Jun. 14, 2022 for EP Application No. 18184236, 30 pages.

Corrected Notice of Allowance and Fees Due (PTOL-85) dated Feb. 26, 2021 for U.S. Appl. No. 15/654,371.

CN Notice of Allowance dated Feb. 11, 2022 for CN Application No. 201810795593, 2 pages.

English translation of CN Notice of Allowance dated Feb. 22, 2022 for CN Application No. 201810795593, 3 pages.

CN Office Action dated May 18, 2023 for CN Application No. 202210445622, 11 page(s).

English Translation of CN Office Action dated May 18, 2023 for CN Application No. 202210445622, 6 page(s).

CN Office Action dated Sep. 18, 2023 for CN Application No. 202210445622, 4 page(s).

English Translation of CN Office Action dated Sep. 18, 2023 for CN Application No. 202210445622, 5 page(s).

CN Notice of Allowance dated Dec. 16, 2023 for CN Application No. 202210445622, 2 page(s).

English Translation of CN Office Action dated Dec. 16, 2023 for CN Application No. 202210445622, 3 page(s).

* cited by examiner

POWERED AIR-PURIFYING RESPIRATOR (PAPR) WITH ECCENTRIC VENTURI AIR FLOW RATE DETERMINATION

CROSS-REFERENCE TO RELATED APPLICATIONS

This application is a continuation application of U.S. patent application Ser. No. 15/654,371, filed Jul. 19, 2017, which is incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Powered air-purifying respirators (PAPRs) are self-contained apparatus for providing breathable air to workers and first responders in an environment that has dust-laden or aerosol-laden air. The PAPR typically comprises a blower driven by an electric motor that draws air from the environment through a filter and provides filtered air to a human being.

SUMMARY

In an embodiment, a powered air-purifying respirator (PAPR) is disclosed. The PAPR comprises an air pump comprising an electric motor, an eccentric venturi communicatively coupled to an air channel of the air pump, wherein the eccentric venturi comprises a first sensor port and a second sensor port, a differential air pressure sensor mechanically coupled to the first sensor port and the second sensor port, and a controller that is communicatively coupled to an electrical output of the differential air pressure sensor and to the electric motor, wherein the controller is configured to control the speed of the electric motor to maintain a predefined rate of flow of purified air based on the electrical output of the differential air pressure sensor.

In another embodiment, a powered air-purifying respirator is disclosed. The PAPR comprises an air pump comprising an electric motor, an eccentric venturi communicatively coupled to an air channel of the air pump, wherein the eccentric venturi comprises a first sensor port and a second sensor port that tap into an interior of the eccentric venturi each at a point opposite a center point of the air pump, a differential air pressure sensor mechanically coupled to the first sensor port and the second sensor port, and a controller that is communicatively coupled to an electrical output of the differential air pressure sensor and to the electric motor, wherein the controller is configured to control the speed of the electric motor to maintain a predefined rate of flow of purified air based on the electrical output of the differential air pressure sensor.

In yet another embodiment, a powered air-purifying respirator is disclosed. The PAPR comprises an air pump comprising an electric motor, an eccentric venturi communicatively coupled to an air channel of the air pump, wherein the eccentric venturi comprises a first sensor port and a second sensor port and wherein the eccentric venturi comprises a throat portion, a conductor portion upstream of the throat portion, and a diffuser portion downstream of the throat portion, wherein a central axis of the diffuser portion makes an angle of greater than 5 degrees with a central axis of the throat portion, a differential air pressure sensor mechanically coupled to the first sensor port and the second sensor port, and a controller that is communicatively coupled to an electrical output of the differential air pressure sensor and to the electric motor, wherein the controller is configured to control the speed of the electric motor to maintain a predefined rate of flow of purified air based on the electrical output of the differential air pressure sensor.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a powered air-purifying respirator (PAPR) with an eccentric venturi. The eccentric venturi is used to provide an indication of a flow rate of air delivered to a breathing apparatus. More specifically, two ports into the eccentric venturi provide an indication of differential pressure which can be processed to estimate the air flow rate, as described in more detail here below. The use of a venturi to derive the estimate of the air flow rate may provide a more accurate estimation of the true air flow rate than alternative flow sensing techniques. The use of the eccentric venturi taught herein is thought to provide both accuracy and a modest physical size compatible with the desire for a conveniently portable PAPR. The accurate estimation of the true air flow enables a more precise control of the PAPR which best supports the antagonistic design objectives of providing adequate flow of purified air and extending the battery life of the PAPR by constraining electric power delivered to an electric motor driving the air pump. Said in other words, accurate estimation of the true air flow enables delivering just enough purified air but not delivering too much air (where too much air would deplete a battery of the PAPR prematurely).

The present disclosure further teaches locating the two differential air pressure ports or taps on an outer radius of the air pump package, which is thought to provide a more accurate sensing of the air flow rate. Not wishing to be bound by theory, it is thought that the mass of air flow through the venturi is not distributed uniformly during use but is greatest along the outer radius of the air pump as it enters the venturi, and hence sensing the differential air pressure at that point of concentrated mass of air flow results in more resolution and an associated greater accuracy.

Figure 1:
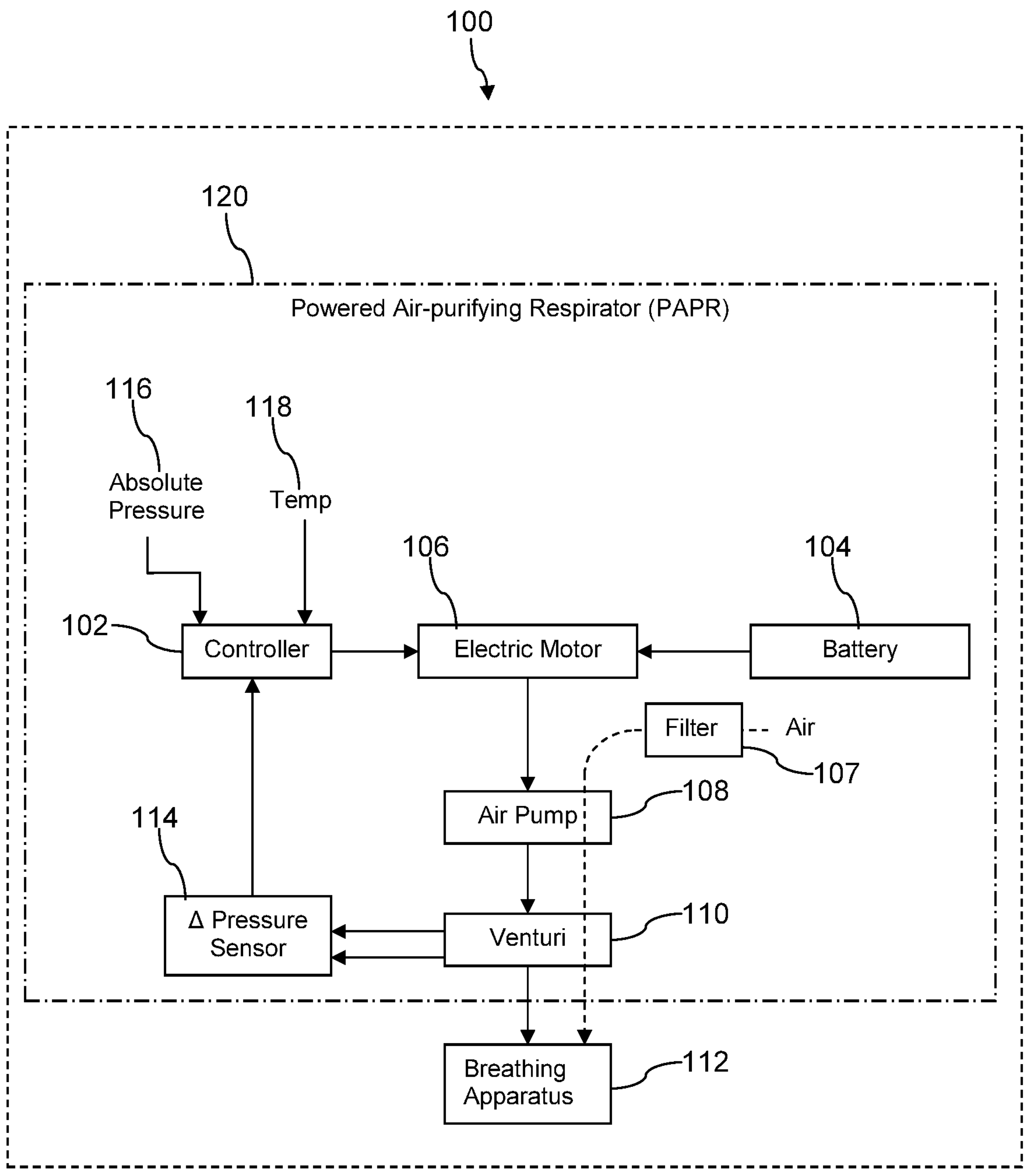
FIG. 1 is a block diagram of a powered air-purifying respirator according to an embodiment of the disclosure.

Turning now to FIG. 1, a system 100 is described. In an embodiment, the system 100 comprises a breathing apparatus 112 and a powered air-purifying respirator (PAPR) 120. In use, the PAPR 120 supplies purified air to the breathing apparatus 112 for inhalation by a human user, for example through a hose and into a hood of the breathing apparatus 112. In some embodiments, the breathing apparatus 112 may be considered to be part of the PAPR 120. In an embodiment, the breathing apparatus 112 may be a hood that is placed over a head of a user and a hose which connects to the PAPR 120. In another embodiment, the breathing apparatus 112 may be a full body suit that the user dons and seals where a hose delivers purified air from the PAPR 120 to the interior of the full body suit, for example to an area proximate to a head of the user.

In an embodiment, the PAPR 120 comprises a controller 102, an electric battery 104, an electric motor 106, a filter 107, an air pump 108, an eccentric venturi 110, and a differential pressure sensor 114. The PAPR 120 may further comprise an absolute pressure sensor 116 and a temperature sensor 118. The illustration of the PAPR 120 in FIG. 1 is not intended to represent physical relationships of components but rather to depict functional flows and interrelationships among components. In an embodiment, a motor drive may be located between the controller 102, the electric battery 104, and the electric motor 106. While in operation, the controller 102 provides control signals to the electric motor 106 that cause the electric motor 106 to increase speed, decrease speed, or maintain current speed. The electric motor 106 receives electric power from the electric battery 104.

The electric motor 106 is mechanically coupled to the air pump 108 such that when the electric motor 106 turns, the air pump 108 turns, and as the electric motor 106 turns faster or slower, the air pump 108 likewise turns faster or slower, respectively. The air pump 108 comprises a centrifugal fan that draws air through the filter 107 from the outside environment. The filter 107 desirably blocks passage of particulate matter and aerosol droplets in the environmental air, thereby purifying the air for safe breathing by a human user of the system 100. Over time the filter 107 may become progressively saturated with particulate matter and/or aerosol droplets, and that progressive saturation would tend to reduce the flow rate of filtered breathable air to the breathing apparatus 112 if the speed of the air pump 108 remains unchanged. The controller 102 adapts the control signal to the electric motor 106 to cause the electric motor 106 to turn fast enough to maintain a desired rate of flow of breathable air to the breathing apparatus 112, up to a maximum operating limit of the electric motor 106.

The controller 102 is able to determine the flow rate of breathable air based on the differential pressure indicated by the differential pressure sensor 114. In an embodiment, the controller 102 determines the flow rate of breathable air further based on the absolute pressure indicated by the absolute pressure sensor 116 and the temperature indicated by the temperature sensor 118. By further basing the determination of air flow rate based on the absolute pressure and the temperature, the controller 102 is able to accurately estimate the air flow rate at different location elevations (e.g., at a first work site at 100 feet above sea level as well as at a second work site at 4,000 feet above sea level) without recalibration of the system 100.

Figure 2:
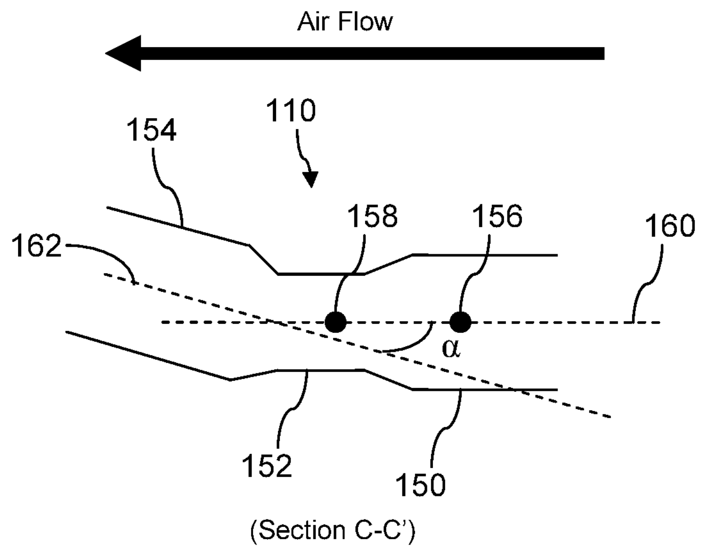
FIG. 2 is an illustration of an eccentric venturi according to an embodiment of the disclosure.

Turning now to FIG. 2, details of the eccentric venturi 110 are described. The view illustrated in FIG. 2 is a sectional view C-C' of the section cut C-C' illustrated in FIG. 3. A venturi generally comprises a flow path with a narrowing in its middle portion which may be called a throat of the venturi. An entrance portion of the flow path of the venturi may be called a conductor and an exit portion of the flow path of the venturi may be called a diffuser. The eccentric venturi 110 comprises a conductor 150, a throat 152, and a diffuser 154. In an embodiment, the eccentric venturi 110 comprises a first port 156 and a second port 158 that both open into an interior of the eccentric venturi 110, the first port 156 opening into an interior of the conductor 150 and the second port 158 opening into an interior of the throat 152. The ports 156, 158 provide differential pressure sensing taps to the differential pressure sensor 114. The flow of air through the eccentric venturi 110 is from right to left in FIG. 2, entering at the conductor 150, flowing next to the throat 152 (e.g., via a first transition portion of the conductor), flowing next into the diffuser 154 (e.g., via a second transition portion of the diffuser), and then flowing out of the eccentric venturi 110.

Figure 3:
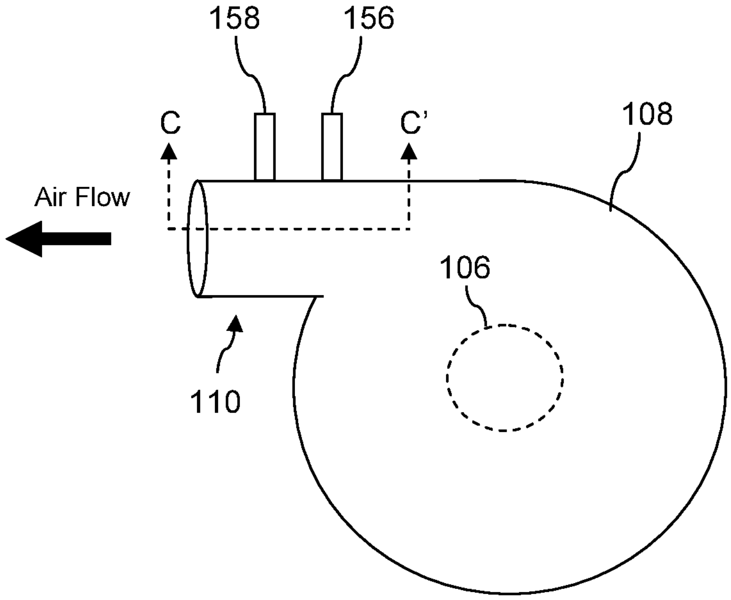
FIG. 3 is an illustration of an air pump according to an embodiment of the disclosure.

The view of the eccentric venturi 110 illustrated in FIG. 2 is a section view of the eccentric venturi 110, where the section perspective is indicated in FIG. 3. The conductor 150 has a first central axis 160, and the diffuser 154 has a second central axis 162 that makes an angle $\alpha$ with the first central axis 160. In an embodiment, the angle $\alpha$ is about 10 degrees, but in another embodiment the angle $\alpha$ may be about 8 degrees, about 9 degrees, about 12 degrees, about 15 degrees, or about 18 degrees. The angle $\alpha$ is less than 35 degrees. While not illustrated in FIG. 2, in an embodiment, the throat 152 may have a third central axis that is offset at an angle to both the first central axis 160 and the second central axis 162, where the third central axis makes an angle with the first central axis 160 that is less than the angle $\alpha$. The angle offset between the first central axis 160 and the second central axis 162 is at least one feature in which the eccentric venturi 110 may be said to be eccentric. While not wishing to be limited by theory, it is thought that the angular offset between the central axes 160, 162 makes the profile of the interior of the eccentric venturi 110 more gradual and less sharply stepped where the maximum air flow occurs which reduces the tendency of turbulence developing, where turbulence inside the eccentric venturi 110 could reduce the accuracy of estimation of the air flow rate.

Turning now to FIG. 3, further details of the air pump 108 are described. The illustration of the air pump 108 is intended to be quasi-representational but not specifically to scale. The air pump 108 encloses a centrifugal fan (not shown) that is turned by the electric motor 106. Air is drawing through the filter 107 into an inlet (not shown) that is located in the center of the air pump 108. The centrifugal fan accelerates and pushes inlet air in a counterclockwise direction (from the perspective illustrated in FIG. 3) and out the diffuser 154 of the eccentric venturi 110. The outside radius of the air pump 108 is the outside portion of the circumference of the air pump 108. In an embodiment, the ports 156, 158 are located on this outside edge of the air pump 108, as illustrated in FIG. 3. While not wishing to be bound by theory, it is thought that the mass flow rate of air in the air pump 108 and through the eccentric venturi 110 is not uniformly distributed but is greater close to the outside radius of the air pump 108 and on the side of the eccentric venturi 110 where the ports 156, 158 are placed. It is thought that locating the ports 156, 158 at this point of greater air mass concentration may increase the resolution and/or the accuracy of the determination of differential pressure sensor.

Figure 4:
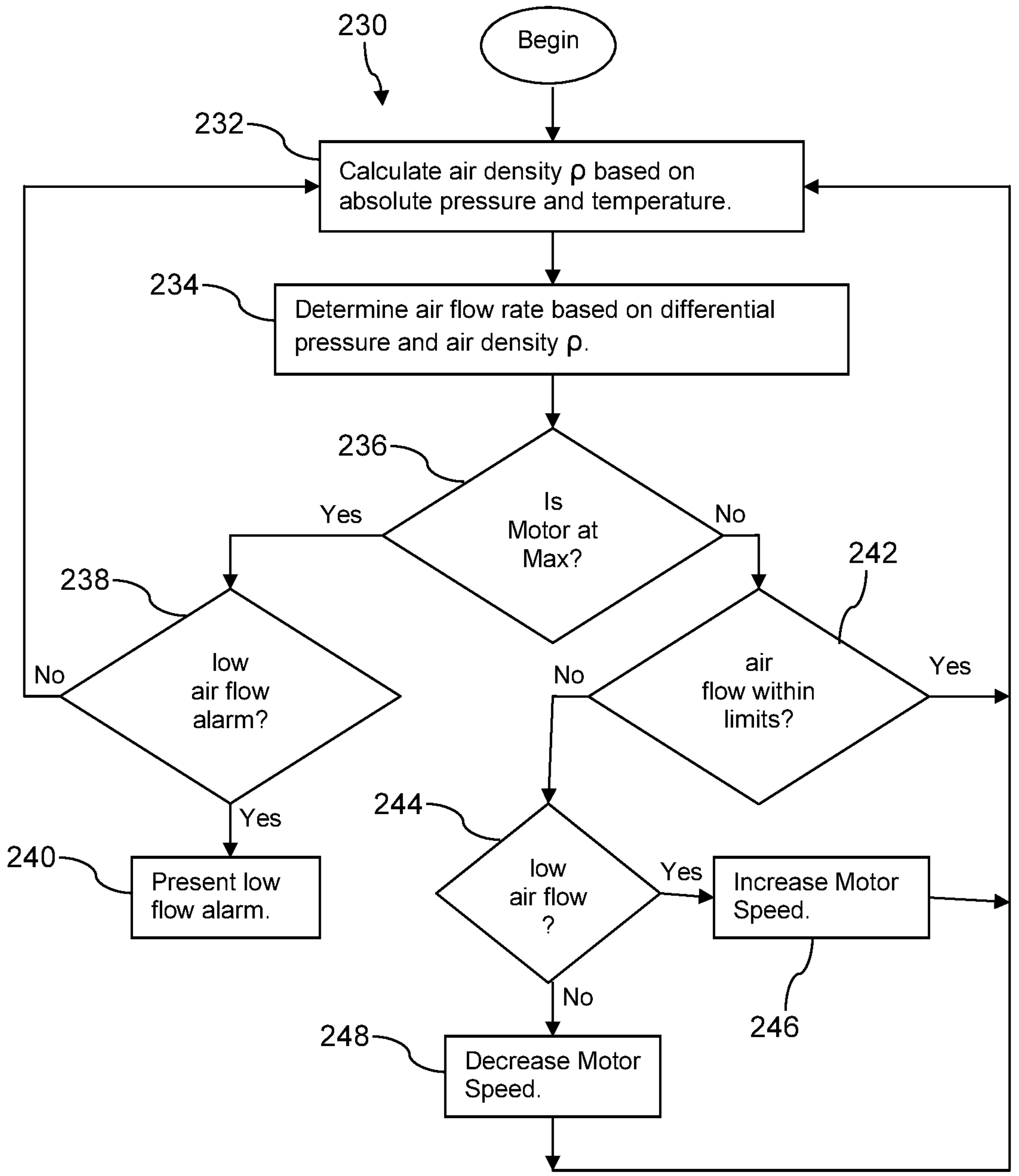
FIG. 4 is a flow chart of a method according to an embodiment of the disclosure.

Turning now to FIG. 4, a method 230 is described. The method 230 may be performed by the controller 102 to develop control signals to command the electric motor 106. At block 232, air density p is calculated based on absolute air pressure and temperature in the local environment. Determination of air density p enables determination of air flow independently of elevation of the location the system 100 is used at (i.e., the system 100 need not be separately calibrated for use at a first elevation and at a second elevation different from the first elevation). The absolute pressure may be provided by the absolute pressure sensor 116, and the temperature may be provided by the temperature sensor 118.

At block 234, the air flow rate through the eccentric venturi 110 (i.e., the output flow rate of breathable air to the breathing apparatus 112) is determined based on differential pressure in the eccentric venturi 110 and based on the air density p. In an embodiment, the air flow rate may be determined based on:

$$Q=K\sqrt{2\delta P/\rho} \quad \text{EQ 1}$$

where Q is the estimated flow rate of air, K is a constant, δP is the differential pressure output by the differential pressure sensor 114, and ρ is the air density. In another embodiment, the estimated air flow rate may be determined from the differential pressure and the density ρ in a different way.

At block 236, if the electric motor 106 is already being operated at its maximum, the method proceeds to block 238. At block 238, the air flow rate Q is compared to a predefined low air flow alarm threshold. If Q is greater than the low air flow alarm threshold, processing returns to block 232. If Q is less than the low air flow alarm threshold, the processing flows to block 240 where a low air flow alarm is presented. The low air flow alarm may be an aural tone that is sounded, a visual alert, or both. At bock 236, if the electric motor 106 is not being operated at its maximum, processing proceeds to block 242.

At block 242, the estimated air flow rate Q is compared to a pre-defined flow rate upper and lower limit. If the air flow rate Q is within the flow limits, processing returns to block 232. If the air flow rate Q is outside of flow limits, processing passes to block 244. If air flow rate Q is less than the lower air flow limit, processing proceeds to block 246 where a command to increase the speed of the electric motor 106 is generated and transmitted by the controller 102 to the electric motor 106. If air flow rate Q is greater than the maximum air flow limit, processing proceeds to block 248 where a command to decrease the speed of the electric motor 106 is generated and transmitted by the controller 102 to the electric motor 106. After the processing of block 246 and block 248 processing returns to block 232. In an embodiment, the return to block 232 from block 238, 242, 246, and 248 is preceded by a time delay. Said in other words, the processing of method 230 may constitute a processing loop that is repeated periodically at some desirable rate, for example 10 times per second, once per second, once every ten seconds, or some other periodic rate.

Figure 5:
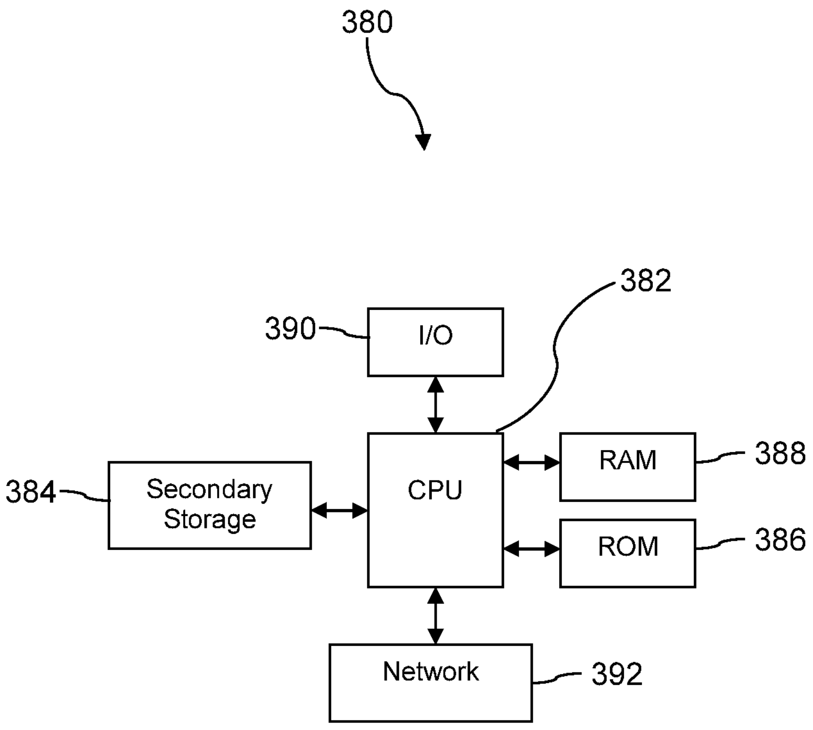
FIG. 5 is a block diagram of a computer system according to an embodiment of the disclosure.

FIG. 5 illustrates a computer system 380 suitable for implementing one or more embodiments disclosed herein. For example, the controller 102 may be implemented at least partially as a computer system. The controller 102 may not have all of the features described below that are present in a fully-featured computer system such as that described below (e.g., the controller 102 may not have a network interface and may not have secondary storage). The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computer system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from a hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that are not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, a magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A respiratory device comprising:
an eccentric venturi including:
a first sensor port and a second sensor port;
a conductor comprising a conductor portion and a first transition portion,
wherein the conductor portion has a first axis,
wherein the first transition portion is downstream from the conductor portion,
wherein a whole circumference of the first transition portion is angularly offset relative to a whole circumference of the conductor portion;
a diffuser comprising a diffuser portion and a second transition portion;
wherein the diffuser portion downstream from the second transition portion having a second axis,
wherein a whole circumference of the second transition portion is angularly offset relative to a whole circumference of the diffuser portion; and
a throat comprising a throat portion downstream from the first transition portion having a third axis, wherein the first transition portion has a first tapered portion transitioning from the conductor portion to the throat portion such that a width of the conductor portion is greater than a width of the throat portion,
wherein the second transition portion is downstream from the throat portion,
wherein the second transition portion has a second tapered portion transitioning from the throat portion to the diffuser portion such that the width of the throat portion is less than a width of the diffuser portion,
wherein the third axis of the throat portion is angularly offset to the first axis of the conductor portion and the second axis of the diffuser portion;
wherein the first axis of the conductor portion makes an angle $\alpha$ with the second axis of the diffuser portion, and
wherein the angle $\alpha$ is at least greater than or equal to 8 degrees and less than 35 degrees.

2. The respiratory device of claim 1, wherein the conductor portion is in fluid communication with the first sensor port.

3. The respiratory device of claim 1, wherein the throat portion is in fluid communication with the second sensor port.

4. The respiratory device of claim 1, further comprising an air pump including an air channel and an electric motor, wherein the eccentric venturi is coupled to the air channel of the air pump.

5. The respiratory device of claim 4, further comprising a controller configured to control a speed of the electric motor to maintain a predefined rate of flow of purified air.

6. The respiratory device of claim 5, further comprising a differential air pressure sensor coupled to the first sensor port and the second sensor port,
wherein the controller controls the speed of the electric motor based on an output of the differential air pressure sensor.

7. The respiratory device of claim 5, further comprising an absolute pressure sensor, wherein the controller controls the speed of the electric motor based on an output of the absolute pressure sensor.

8. The respiratory device of claim 5, further comprising a temperature sensor, wherein the controller controls the speed of the electric motor based on an output of the temperature sensor.

9. The respiratory device of claim 5, further comprising a breathing apparatus.

10. A powered air-purifying respirator (PAPR) comprising:
an air pump including an air channel and an electric motor; and
an eccentric venturi, coupled to the air channel, including:
a first sensor port and a second sensor port;
a conductor comprising a conductor portion and a first transition portion,
wherein the conductor portion has a first axis,
wherein the first transition portion downstream from the conductor portion, and
wherein a whole circumference of the first transition portion is angularly offset relative to a whole circumference of the conductor portion;
a diffuser comprising a diffuser portion and a second transition portion, the diffuser portion downstream from the second transition portion having a second axis; and
a throat comprising portion downstream from the first transition portion having a third axis, wherein the first transition portion has a first tapered portion such that a width of the conductor portion is greater than a width of the throat portion;

wherein the second transition portion is downstream from the throat portion, wherein a whole circumference of the second transition portion is angularly offset relative to a whole circumference of the diffuser portion, wherein the second transition portion has a second tapered portion such that the width of the throat portion is less than a width of the diffuser portion, wherein the third axis of the throat portion is angularly offset to the first axis of the conductor portion and the second axis of the diffuser portion, wherein the first axis of the conductor portion makes an angle α with the second axis of the diffuser portion, and wherein the angle α is at least greater than or equal to 8 degrees and less than 35 degrees.

11. The PAPR of claim 10, further comprising a controller configured to control a speed of the electric motor to maintain a predefined rate of flow of purified air.

12. The PAPR of claim 11, further comprising a differential air pressure sensor coupled to the first sensor port and the second sensor port, wherein the controller controls the speed of the electric motor based on an output of the differential air pressure sensor.

13. The PAPR of claim 11, further comprising an absolute pressure sensor, wherein the controller controls the speed of the electric motor based on an output of the absolute pressure sensor.

14. The PAPR of claim 11, further comprising a temperature sensor, wherein the controller controls the speed of the electric motor based on an output of the temperature sensor.

* * * * *